United States Patent
Kong et al.

(10) Patent No.: US 12,330,480 B2
(45) Date of Patent: Jun. 17, 2025

(54) QUARTER GLASS ASSEMBLY FOR A VEHICLE AND A MANUFACTURING METHOD THEREFOR

(71) Applicants: HYUNDAI MOTOR COMPANY, Seoul (KR); KIA CORPORATION, Seoul (KR); SE JIN CO., LTD, Gyeongju-si (KR)

(72) Inventors: Nak Kyoung Kong, Seongnam-si (KR); Sang Heon Wang, Bucheon-si (KR); Chan Joo Moon, Hwaseong-si (KR); Kyung Hwan Kim, Seoul (KR); Pil Gu Jang, Gyeongju-si (KR); Min Hyung Son, Ulsan (KR)

(73) Assignees: HYUNDAI MOTOR COMPANY, Seoul (KR); KIA CORPORATION, Seoul (KR); SE JIN CO., LTD, Gyeongju-si (KR)

( * ) Notice: Subject to any disclaimer, the term of this patent is extended or adjusted under 35 U.S.C. 154(b) by 419 days.

(21) Appl. No.: 18/083,065

(22) Filed: Dec. 16, 2022

(65) Prior Publication Data
US 2024/0025238 A1    Jan. 25, 2024

(30) Foreign Application Priority Data
Jul. 20, 2022  (KR) .......................... 10-2022-0089471

(51) Int. Cl.
*B60J 1/10*    (2006.01)
*B60J 1/00*    (2006.01)
*B60R 13/04*   (2006.01)

(52) U.S. Cl.
CPC ................. *B60J 1/004* (2013.01); *B60J 1/10* (2013.01); *B60R 13/04* (2013.01)

(58) Field of Classification Search
CPC .. B60R 13/04; B60J 1/004; B60J 1/007; B60J 1/08; B60J 1/10; B60J 10/70
(Continued)

(56) References Cited

U.S. PATENT DOCUMENTS 3,895,859 A * 7/1975 Yoshida .................... B60J 3/007
                                                     296/96.19
4,332,413 A * 6/1982 Erion ........................ B60J 1/08
                                                     160/371
(Continued)

FOREIGN PATENT DOCUMENTS

JP    2015157493 A    9/2015
JP    2018144527 A    9/2018
(Continued)

*Primary Examiner* — Gregory A Blankenship
(74) *Attorney, Agent, or Firm* — Lempia Summerfield Katz LLC

(57) ABSTRACT

A quarter glass assembly for a vehicle includes a glass window and a plastic glass disposed adjacent to the glass window and forming, with the glass window, a partitioned quarter glass. The assembly includes decorative members integrally provided to cover edges of one side and an opposite side of the plastic glass and provided vertically with respect to the front of the quarter glass, a main trim piece provided to surround a rim of the glass window and upper and lower portions of the plastic glass, and a molding member provided to integrate the glass window and the plastic glass by including the decorative members and the main trim piece.

10 Claims, 4 Drawing Sheets

(58) Field of Classification Search
USPC .......................................... 296/146.15, 1.08
See application file for complete search history.

(56) References Cited

U.S. PATENT DOCUMENTS

| | | | | |
|---|---|---|---|---|
| 5,020,848 | A * | 6/1991 | Raj | B60J 1/08 |
| | | | | 296/210 |
| 5,046,284 | A * | 9/1991 | Harper | B60J 1/006 |
| | | | | 296/218 |
| 6,116,678 | A * | 9/2000 | Beck | B60J 1/10 |
| | | | | 296/200 |
| 7,162,840 | B1 * | 1/2007 | Thomas | B60Q 1/268 |
| | | | | 296/200 |
| 8,215,700 | B2 * | 7/2012 | Alvarez | B60R 13/04 |
| | | | | 296/146.15 |
| 9,027,294 | B2 | 5/2015 | Bennett | |
| 10,195,928 | B2 | 2/2019 | Liu | |
| 2006/0209551 | A1 * | 9/2006 | Schwenke | B32B 27/365 |
| | | | | 313/506 |
| 2010/0327622 | A1 * | 12/2010 | Lauderlein | B60R 13/04 |
| | | | | 296/146.15 |
| 2011/0042848 | A1 * | 2/2011 | Ash | B29C 45/14434 |
| | | | | 264/265 |
| 2014/0170357 | A1 * | 6/2014 | Tooker | B60J 10/70 |
| | | | | 428/38 |
| 2015/0165884 | A1 * | 6/2015 | Lee | B60J 10/78 |
| | | | | 49/504 |
| 2015/0258876 | A1 * | 9/2015 | Kondo | B60R 13/04 |
| | | | | 296/146.15 |
| 2017/0066305 | A1 * | 3/2017 | Tooker | B32B 17/10779 |
| 2019/0005755 | A1 * | 1/2019 | Snider | B60J 1/10 |
| 2022/0032753 | A1 | 2/2022 | Yu et al. | |
| 2022/0072936 | A1 * | 3/2022 | Hatta | B60J 1/10 |
| 2023/0271484 | A1 * | 8/2023 | Takahashi | B60J 1/007 |
| | | | | 296/146.15 |
| 2024/0025238 | A1 * | 1/2024 | Kong | B60J 1/10 |
| 2024/0375577 | A1 * | 11/2024 | Zeng | B60Q 1/2649 |

FOREIGN PATENT DOCUMENTS

| | | |
|---|---|---|
| JP | 2021098508 A | 7/2021 |
| KR | 20090008743 A | 1/2009 |
| KR | 101704226 B1 | 2/2017 |
| WO | 2020094083 A1 | 5/2020 |

* cited by examiner

QUARTER GLASS ASSEMBLY FOR A VEHICLE AND A MANUFACTURING METHOD THEREFOR

CROSS REFERENCE TO RELATED APPLICATION

The present application claims priority to Korean Patent Application No. 10-2022-0089471, filed Jul. 20, 2022, the entire contents of which are incorporated herein for all purposes by this reference.

BACKGROUND OF THE DISCLOSURE

Technical Field

The present disclosure relates to a quarter glass assembly for a vehicle and, more particularly, to a quarter glass assembly for a vehicle that may implement a conceptualized two lines, which are applied to the quarter glass, giving the quarter glass a sense of unity, thereby providing a sense of a luxurious design for the quarter glass.

Description of the Related Art

In general, window glass in a vehicle is necessary not only to secure a driver's visibility and comfortable interior habitability (e.g., a comfortable temperature) but also to serve to ensure the safety of a passenger in a collision.

Such window glass may be classified into front glass and other glass depending on the areas of use. Such other glass refers to glass other than the front glass. Accordingly, quarter glass installed between a rear door and a trunk (or between a quarter pillar and a rear pillar) is one example of a side window glass and is classified as other glass.

In general, quarter glass is provided with a core material that is inserted into an end part (or a corner part) of a molding portion for rigidity reinforcement in order to prevent excessive deformation of the molding portion molded at an edge thereof. Such a core material is disposed at the corner portion of the molding portion by being inserted into a mold during injection molding of the molding portion.

However, in the process of molding the molding portion, when the core material is not properly fixed to a mold or injection pressure in the mold is excessive, not only does an excessive flow of the core material occur, but also a problem that the molding portion is not properly formed is caused as a result thereof.

In addition, in the case of the quarter glass implemented in the above way, a focus is on improving the aesthetics of the rim of the quarter glass. However, as focus on the interior passenger space of the vehicle has increased in recent years, efforts to improve the aesthetics of an entire quarter glass have been made.

The foregoing is intended merely to enhance understanding of the background of the present disclosure. The foregoing is not intended to mean that the present disclosure falls within the purview of the related art that is already known to those of ordinary skill in the art.

SUMMARY OF THE DISCLOSURE

Accordingly, the present disclosure has been made keeping in mind the above problems occurring in the related art. The present disclosure is intended to provide a quarter glass assembly for a vehicle that may provide a sense of luxurious design of the quarter glass. The quarter glass assembly may be provided with a plastic glass made of polymethyl methacrylate (PMMA) or polycarbonate (PC), a front trim piece (SUS) and a rear trim piece (SUS) applied by being injected into the plastic glass in order to implement the appearance of, i.e., a conceptualized two lines in the quarter glass. An occurrence of a step difference between the plastic glass and tempered glass is minimized by manufacturing the plastic glass and the tempered glass in an integrated state through the PVC molding member, thereby realizing the conceptualized two lines in the quarter glass providing a sense of unity.

In order to achieve the above objective, according to one aspect of the present disclosure, a quarter glass assembly for a vehicle is provided. The assembly includes: a glass window; a plastic glass disposed adjacent to the glass window and, with the glass window, forming a partitioned quarter glass; decorative members integrally provided to cover edges of one side and an opposite side of the plastic glass and provided vertically with respect to the front of the quarter glass; a main trim piece provided to surround a rim of the glass window and upper and lower portions of the plastic glass; and a molding member provided to integrate the glass window and the plastic glass by including the decorative members and the main trim piece.

Here, the decorative members may include a front trim piece and a rear trip piece provided to implement two lines.

The plastic glass may be made of one of either polymethyl methacrylate (PMMA) or polycarbonate (PC).

In addition, the plastic glass may be provided to have a relatively thick thickness compared with the glass window.

Such a plastic glass may be provided to have a visible light transmittance of from 5% to 30% or less in black color and may be selectively coated on one surface exposed to the outside.

In addition, the plastic glass may be provided such that a shape of one surface exposed to the outside through between the front trim piece and the rear trim piece for implementing the two lines is selectively engraved or embossed.

In addition, the molding member may be provided with a plurality of boss members provided to protrude at a boundary position between the glass window and the plastic glass and disposed to face a panel fixed to an interior side.

In addition, the molding member may be provided with a fastening member provided to be fastened to an insert bolt in a state in which the insert bolt inserted at a boundary position between the glass window and the plastic glass penetrates a panel fixed to the interior side.

Here, the decorative members may be provided to partially cover the edges of the one side and the opposite side of the plastic glass, thereby enabling a space to be formed for inserting the insert bolt at the boundary position.

On the other hand, the assembly may further include a blocking layer selectively applied to an inner surface of the glass window and the plastic glass and provided to shield the interior trim including a panel fixed to the interior side from the outside.

As described above, the present disclosure can have an effect of providing a sense of luxurious design of quarter glass, wherein the quarter glass assembly may be provided with a plastic glass made of polymethyl methacrylate (PMMA) or polycarbonate (PC), a front trip piece and a rear trip piece are applied by being injected into the plastic glass in order to implement a conceptualized two lines to the quarter glass, and the plastic glass and tempered glass are manufactured in an integrated state through the PVC molding member, thereby realizing the conceptualized two lines in the quarter glass to provide a sense of unity.

In addition, in the present disclosure, in providing the plastic glass, the visible light transmittance is implemented at a level no greater than 45% so that the occurrence of a step difference between the plastic glass and the tempered glass is minimized, and an effect that can provide a feeling similar to that of the tempered glass is achieved.

In addition, the present disclosure has, with respect to the boundary position between the plastic glass and the tempered glass, at least one boss member provided to protrude in the PVC molding member facing the panel on the interior side, so that a part vulnerable to bending and external pressing can be structurally reinforced. This thereby has an effect of preventing an occurrence of problems such as wobbling due to the above part in advance.

BRIEF DESCRIPTION OF THE DRAWINGS

The above and other objectives, features, and advantages of the present disclosure should be more clearly understood from the following detailed description when taken in conjunction with the accompanying drawings, in which.

DETAILED DESCRIPTION OF THE DISCLOSURE

Hereinbelow, embodiments of the present disclosure are described in detail with reference to the accompanying drawings.

Advantages and features of the present disclosure and a method of achieving the same should become apparent with reference to the embodiments described below in detail in conjunction with the accompanying drawings.

However, the present disclosure is not limited by the embodiments disclosed below but may be implemented in a variety of different forms. Here, such embodiments are only provided to make the present disclosure complete and to fully inform those of ordinary skill in the art to which the present disclosure pertains. The present disclosure is only defined by the scope of the appended claims.

In addition, in the description of the present disclosure, when related known technologies may obfuscate the gist of the present disclosure, a detailed description thereof has been omitted. When a component, device, element, or the like of the present disclosure is described as having a purpose or performing an operation, function, or the like, the component, device, or element should be considered herein as being "configured to" meet that purpose or perform that operation or function.

Figure 1:
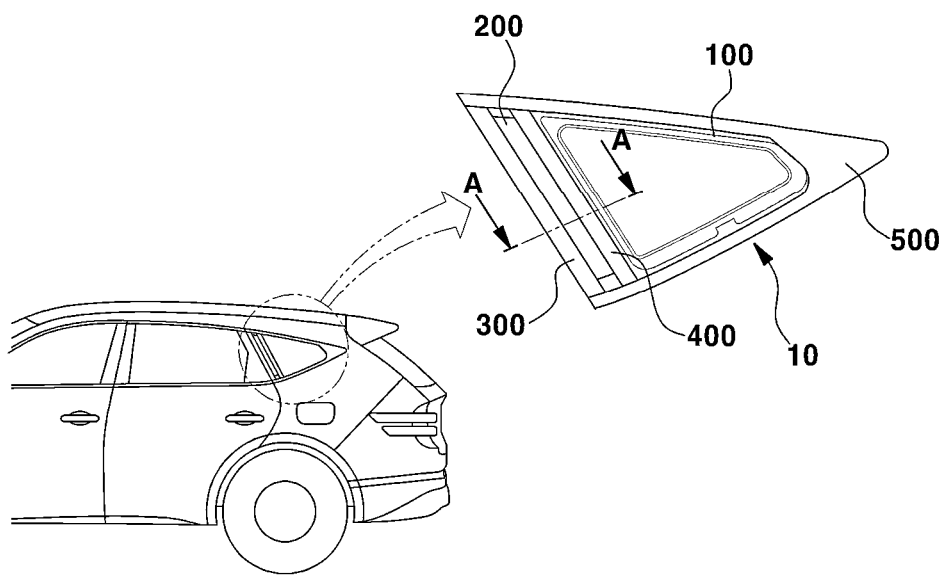
FIG. 1 is a view showing a quarter glass with respect to a quarter glass assembly for a vehicle according to an embodiment of the present disclosure.
Figure 2:
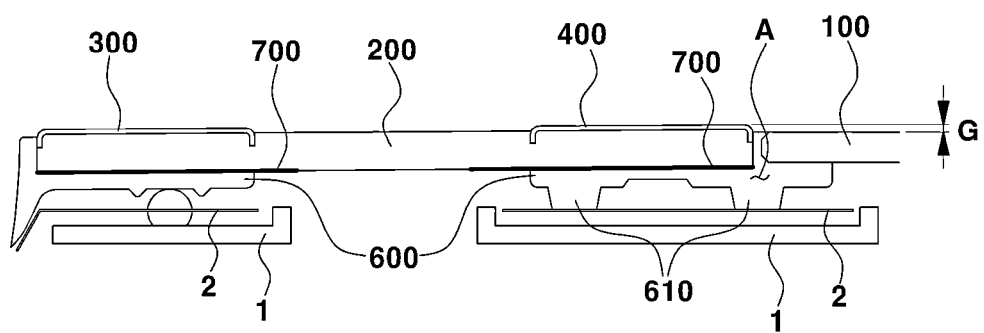
FIG. 2 is a sectional view taken along line A-A of FIG. 1 for showing two lines with respect to the quarter glass assembly for a vehicle according to an embodiment of the present disclosure.

FIG. 1 is a view showing quarter glass with respect to a quarter glass assembly for a vehicle according to an embodiment of the present disclosure. FIG. 2 is a sectional view taken along line A-A of FIG. 1 for showing two lines with respect to the quarter glass assembly for a vehicle according to an embodiment of the present disclosure.

Figure 3:
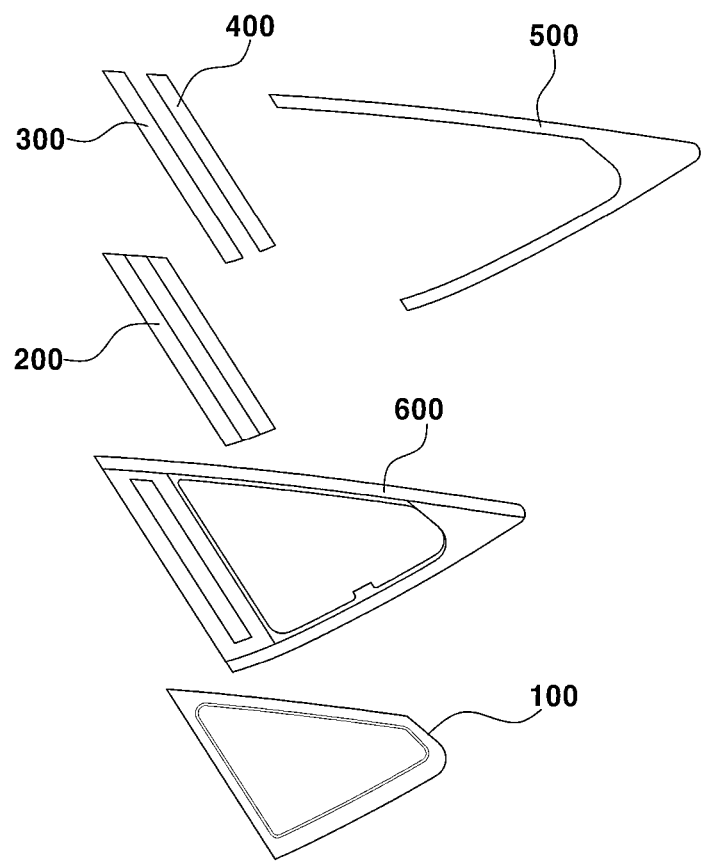
FIG. 3 is an exploded view showing a separated state of the quarter glass assembly for a vehicle according to an embodiment of the present disclosure.
Figure 4:
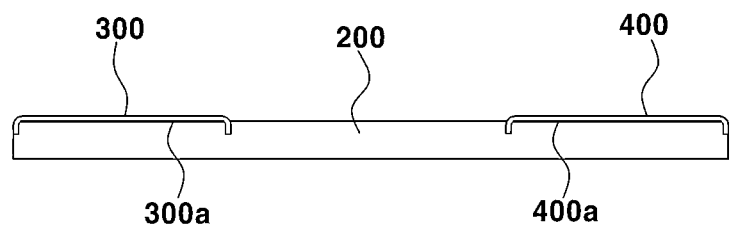
FIG. 4 is a view showing an embodiment of a plastic glass with respect to the quarter glass assembly for a vehicle according to an embodiment of the present disclosure.
Figure 5:
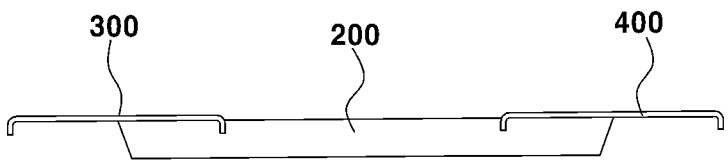
FIG. 5 is a view showing another embodiment of a plastic glass with respect to a quarter glass assembly for a vehicle according to the present disclosure.
Figure 6:
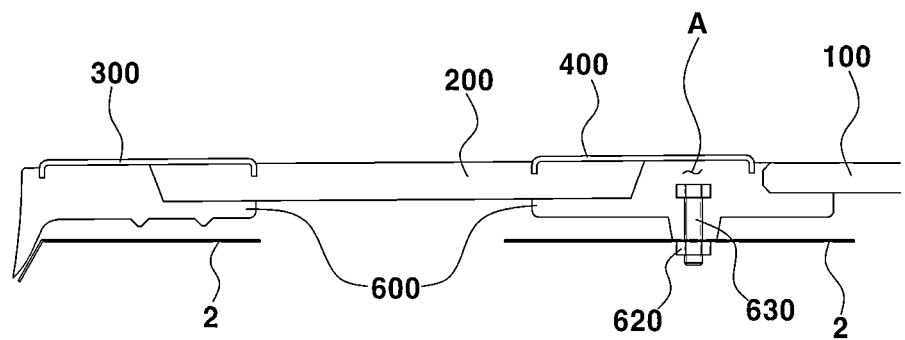
FIG. 6 is a view showing a molding member of another embodiment of a plastic glass with respect to a quarter glass assembly for a vehicle according to the present disclosure.

FIG. 3 is an exploded view showing a separated state of the quarter glass assembly for a vehicle according to an embodiment of the present disclosure. FIG. 4 is a view showing an embodiment of a plastic glass with respect to the quarter glass assembly for a vehicle according to an embodiment of the present disclosure. FIG. 5 is a view showing another embodiment of a plastic glass with respect to a quarter glass assembly for a vehicle according to the present disclosure. FIG. 6 is a view showing a molding member of another embodiment of a plastic glass with respect to a quarter glass assembly for a vehicle according to the present disclosure.

Figure 7:
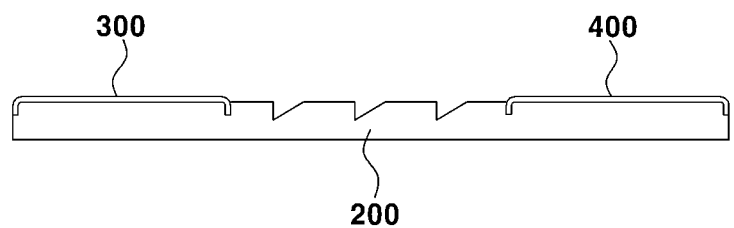
FIG. 7 is a view showing an engraved surface shape of a plastic glass with respect to a quarter glass assembly for the vehicle according to an embodiment of the present disclosure.
Figure 8:
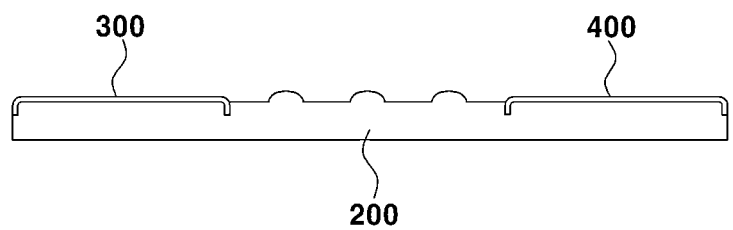
FIG. 8 is a view showing an embossed surface shape of a plastic glass with respect to a quarter glass assembly for the vehicle according to an embodiment of the present disclosure.

FIG. 7 is a view showing an engraved surface shape of a plastic glass with respect to a quarter glass assembly for the vehicle according to an embodiment of the present disclosure. FIG. 8 is a view showing an embossed surface shape of a plastic glass with respect to a quarter glass assembly for the vehicle according to an embodiment of the present disclosure.

As shown in FIGS. 1 and 2, the quarter glass assembly for a vehicle according to the present embodiment includes a glass window 100, a plastic glass 200, decorative members, a main trim piece (SUS) 500, and a molding member 600.

The glass window 100 constitutes a part of a quarter glass of the assembly and is made of tempered glass.

As shown in FIG. 1, the glass window 100 has an acute angle structure in which the angle is gradually decreased toward a rear side in a state in which the glass window is installed between a rear door and a trunk of a vehicle.

In addition, the plastic glass 200 makes the quarter glass be partitioned along with the glass window 100. The plastic glass 200 is disposed adjacent to the glass window 100 and may have a different though similar thickness compared to the glass window 100.

In other words, in order for two lines to be implemented in the quarter glass 10 by a front trim piece (SUS) 300 and a rear trim piece (SUS) 400 constituting the decorative members, the plastic glass 200 is disposed independently from the glass window 100. Through this, it is possible to provide an effect of designing the plastic glass 200 separately from the glass window 100 as one piece of the quarter glass 10 and, at the same time, to provide an effect of improving or altering the aesthetic appearance while maintaining transparency using material characteristics.

To this end, the plastic glass 200 may be made of a material such as polymethyl methacrylate (PMMA), polycarbonate (PC), or the like.

Where the plastic glass 200 may be made of the tempered glass in the same way as the glass window 100, the front trim piece 300 and the rear trim piece 400, which are otherwise injection molded to the plastic glass 200 to realize the two lines, would have to be installed on the tempered glass in a state where additional PVC material is injected to the tempered glass by being encapsulated. So, inevitably, the plastic glass 200 would have an increased thickness, whereby a relatively big step difference in the quarter glass 10 would be disposed between the window galls 100 and the plastic glass 200. Therefore, using such a plastic material above is to prevent in advance an occurrence of problems such as the occurrence of a step or height difference.

A height difference G between a height of the plastic glass 200 in a state in which the front trim piece 300 and the rear trim piece 400 are injection molded into the plastic glass 200 and a height of the glass window 100 may be no greater than mm. Accordingly, it is possible to almost eliminate the occurrence of a step difference, thereby implementing the plastic glass 200 having a sense of unity with respect to the glass window 100. This may realize a design of the quarter glass 10 having a luxurious impression.

In addition, the plastic glass 200 is a transparent engineering plastic. In order to maintain physical rigidity of the glass level, the plastic glass 200 is applied to a thickness greater than the thickness of the glass window 100. However, as described above, the plastic glass 200 may be applied to a thickness of a level of 3.5T to 4T, so that the height difference G with the glass window 100 is no greater than 0.7 mm.

In addition, in order to reduce a sense of heterogeneity with the glass window 100, the plastic glass 200 may be provided to allow a visible light transmittance of black color to be applied at a level 45% or less and, furthermore, to have a transmittance of from 5% to 30% or less.

Along with this, in the case of the plastic glass 200, between the front trim piece 300 and the rear trim piece 400, a hard coating may be applied with a masking technique to one surface exposed to the exterior side. Accordingly, it is possible to strengthen the scratch resistance of the plastic glass 200 exposed to the exterior side.

In addition, in the present embodiment, with respect to the plastic glass 200, one surface exposed to the exterior side or vehicle exterior as described above is formed in a flat shape, i.e., flat surface texture or contour, and has been described with reference to FIG. 2 and the like. However, this corresponds to only one embodiment and the present disclosure is not limited thereto.

More specifically, in addition to the flat shape, as shown in FIG. 7, the center of the plastic glass 200 is processed so that one surface (e.g., a first surface) between the front trim piece 300 and the rear trim piece 400 is engraved. Alternatively, as shown in FIG. 8, it is also possible to process the center of the plastic glass 200 so that one surface between the front trim piece 300 and the rear trim piece 400 is embossed. Therefore, according to the request of the customer, various shapes or surface textures, contours, features, etc. of the one surface of the plastic glass 200 exposed to the exterior side between the front trim piece 300 and the rear trim piece 400 may be provided to improve aesthetics.

As a result, through a structure in which one surface exposed to the exterior side of the plastic glass 200 is changed to an engraved or embossed shape, or other colors are applied differently as described above, it is possible to further improve the aesthetics of the quarter glass 10.

On the other hand, the front trim piece 300 and the rear trim piece 400 are integrally molded through insert injection while covering edges of one side (e.g., a first side) and an opposite side (e.g., a second side) of the plastic glass 200, as shown in FIGS. 2 and 3.

The front trim piece 300 and the rear trim piece 400 are implemented through insert injection molding into the plastic glass 200. The amount of protrusion for the plastic glass 200 may be selectively adjusted compared with the glass window 100 therethrough, so the difference G may be managed to be no greater than 0.7 mm or designed to have a desired distance G.

Here, as shown in FIG. 4, the front trim piece 300 and the rear trim piece 400 may have primers 300*a* and 400*a* respectively applied between the trim piece 300 and 400 and the plastic glass 200. Thus, the adhesive force with the plastic glass 200 may be increased.

With respect to the front of the quarter glass 10 formed by being partitioned into the glass window 100 and the plastic glass 200, the front trim piece 300 and the rear trim piece 400 may implement the conceptualized two lines vertically from the outside of the vehicle (See FIG. 1). The aesthetics of the edge of the quarter glass 10 along with the main trim piece 500 may thereby be improved or altered.

As shown in FIG. 3, the main trim piece 500 is formed to surround a rim of the glass window 100 and upper and lower portions of the plastic glass 200. The molding member 600 is provided to allow the front trim piece 300, the rear trim piece 400, and the glass window 100 including the main trim piece 500 to integrate the plastic glass 200.

Here, the molding member 600 is made of a polyvinyl chloride (PVC) material and may include a plurality of boss members 610 protruding from the boundary position A between the glass window 100 and the plastic glass 200.

As shown in FIG. 2, the boss member 610 is made of PVC material in the same way as the molding member 600 and is disposed to face the panel 2 fixed to the interior trim 1 on the interior side.

In general, a portion where the glass window 100 and the plastic glass 200 contact or join to one another may be designated as boundary position A. When pressure such as pressing occurs from the exterior side, the quarter glass 10 is inevitably vulnerable with respect to an occurrence of bending and the like due to structural characteristics thereof, since the glass window 100 and the plastic glass 200 are provided by being partitioned from each other.

To resolve such a matter, when the molding member 600 is subjected to insert injection molding with respect to the plastic glass 200 having the front trim piece 300 and the rear trim piece 400 also subjected to insert injection molding, at least one boss member 610 may be disposed on the molding member 600 to protrude toward panel 2 at the boundary position A and to face and be in contact with the panel 2. Thereby, an occurrence of bending is prevented due to pressing and structurally reinforcing the portion where the glass window 100 and the plastic glass 200 contact each other.

In addition, as shown in FIG. 6, an insert bolt 630 inserted or installed at the boundary position A between the glass window 100 and the plastic glass 200 penetrates the panel 2 fixed to the indoor side. Thus, the molding member 600 may be provided with a fastening member 620, such as a nut, formed to be fastened to the insert bolt 630.

To this end, the front trim piece 300 and the rear trim piece 400 may be formed to partially cover the edges of one side and the opposite side of the plastic glass 200 (see FIG. 5), thereby forming a predetermined space for the insert bolt 630 to be installed at the boundary position A.

Accordingly, through fastening the fastening member 620, i.e., a nut, to the insert bolt 630, structural reinforcement may be provided for the boundary position A where the glass window 100 and the plastic glass 200 are brought in contact on the panel 2 on the interior side. Through this, in the same way as the boss member 610 described above, it is possible to prevent an/the occurrence of bending of the boundary position A of the molding member 600. Thus, the portion where the glass window 100 and the plastic glass 200 are brought in contact may be structurally reinforced.

Meanwhile, the quarter glass assembly for a vehicle according to the present embodiment may further include a blocking layer 700, i.e., tinting, that is selectively applied to inner surfaces of the glass window 100 and the plastic glass 200. The blocking layer 700 may have a predetermined length and may be formed to extend lengthwise or vertically.

As shown in FIG. 2, the blocking layer 700 is provided to shield the interior trim 1 including the panel 2 fixed to the interior side from the exterior side and may be a black layer of paint or ceramic.

As a result, the blocking layer 700 may prevent, in advance, the problem in that the interior is seen through the quarter glass assembly from the exterior of the vehicle by selectively applying the blocking layer 700 to the glass window 100 or the plastic glass 200 made of transparent engineering plastic. Accordingly, the blocking layer 700 may improve aesthetics by blocking the exposure of the interior trim 1 including the panel 2.

The present disclosure may have an effect of providing a sense of luxurious design of the quarter glass. The quarter glass assembly may be provided with a plastic glass made of polymethyl methacrylate (PMMA) or polycarbonate (PC), a front trim piece and a rear trim piece applied by being injected into the plastic glass in order to implement a conceptualized two lines in the quarter glass. Further, the plastic glass and the tempered glass are manufactured in an integrated state through the PVC molding member, thereby realizing the conceptualized two lines in the quarter glass providing a sense of unity. The two conceptualized lines are just one of many possible examples of stylized members that can be added to the plastic glass 200 to alter the aesthetics of the quarter glass assembly.

In addition, in the present disclosure, in providing the plastic glass, the visible light transmittance is implemented at a level no greater than 45% so that the occurrence of a step difference between the plastic glass and the tempered glass is minimized, and so that an effect is achieved that may provide a feeling similar to that of the tempered glass.

In addition, the present disclosure has, with respect to the boundary position between the plastic glass and the tempered glass, at least one boss member provided to protrude in the PVC molding member facing the panel on the interior side. Thus, a part vulnerable to bending and external pressing may be structurally reinforced, thereby having an effect of preventing in advance an occurrence of problems such as wobbling, deformation, and/or noise generation due to the above part.

Although the present disclosure has been described with reference to the embodiment(s) shown in the drawings, the embodiments described and shown are merely examples, and various modifications may be made therefrom by those of ordinary skill in the art. It should be understood that all or part of the above-described embodiments may be configured by being optionally combined. Accordingly, the true technical protection scope of the present disclosure should be defined by the technical spirit of the appended claims.

What is claimed is:

1. A quarter glass assembly for a vehicle, the assembly comprising:
    a glass window;
    a plastic glass disposed adjacent to the glass window and forming, with the glass window, a partitioned quarter glass;
    decorative members integrally provided to cover edges of one side and an opposite side of the plastic glass and provided vertically with respect to the front of the quarter glass;
    a main trim piece provided to surround a rim of the glass window and upper and lower portions of the plastic glass; and
    a molding member provided to integrate the glass window and the plastic glass by including the decorative members and the main trim piece.

2. The assembly of claim 1, wherein the decorative members comprise a front trim piece and a rear trim piece provided to implement two lines.

3. The assembly of claim 1, wherein the plastic glass is made of polymethyl methacrylate (PMMA) or polycarbonate (PC).

4. The assembly of claim 1, wherein the plastic glass is provided to have a relatively thick thickness compared with the glass window.

5. The assembly of claim 1, wherein the plastic glass is provided to have a visible light transmittance of from 5% to 30% or less in black color and is selectively coated on one surface exposed to an exterior side.

6. The assembly of claim 2, wherein the plastic glass is provided such that a shape of the one surface exposed to the exterior side between the front trim piece and the rear trim piece for implementing the two lines is selectively engraved or embossed.

7. The assembly of claim 1, wherein the molding member is provided with a plurality of boss members protruding at a boundary position between the glass window and the plastic glass and disposed to face a panel fixed to an interior side.

8. The assembly of claim 1, wherein the molding member is provided with a fastening member configured to be fastened to an insert bolt in a state in which the insert bolt inserted at a boundary position between the glass window and the plastic glass penetrates a panel fixed to an interior side.

9. The assembly of claim 8, wherein the decorative members are provided to partially cover the edges of the one side and the opposite side of the plastic glass, thereby forming a space for inserting the insert bolt at the boundary position.

10. The assembly of claim 1, further comprising:
    a blocking layer selectively applied to an inner surface of the glass window and the plastic glass and provided to shield interior trim including a panel fixed to the interior side from the outside.

* * * * *